(12) United States Patent
Bessonov (10) Patent No.: US 8,028,276 B1
(45) Date of Patent: Sep. 27, 2011

(54) METHOD AND SYSTEM FOR GENERATING A TEST FILE

(75) Inventor: Dmitry Nickolaevich Bessonov, St. Petersburg (RU)

(73) Assignee: Oracle America, Inc., Redwood City, CA (US)

( * ) Notice: Subject to any disclaimer, the term of this patent is extended or adjusted under 35 U.S.C. 154(b) by 1124 days.

(21) Appl. No.: 11/771,362

(22) Filed: Jun. 29, 2007

(51) Int. Cl.
*G06F 9/44* (2006.01)
*G06F 9/45* (2006.01)

(52) U.S. Cl. .................. 717/124; 717/128; 717/143

(58) Field of Classification Search .................. None
See application file for complete search history.

(56) References Cited

U.S. PATENT DOCUMENTS

| | | | | |
|---|---|---|---|---|
| 4,819,233 | A * | 4/1989 | Delucia et al. | 717/129 |
| 6,353,925 | B1 * | 3/2002 | Stata et al. | 717/112 |
| 7,237,231 | B2 * | 6/2007 | Lambert | 717/127 |
| 7,707,564 | B2 * | 4/2010 | Marvin et al. | 717/140 |
| 7,913,229 | B2 * | 3/2011 | Squires et al. | 717/124 |
| 2003/0145282 | A1 * | 7/2003 | Thomas et al. | 715/513 |
| 2003/0191864 | A1 * | 10/2003 | Govindarajapuram et al. | 709/310 |
| 2004/0181713 | A1 * | 9/2004 | Lambert | 714/48 |
| 2004/0186817 | A1 * | 9/2004 | Thames et al. | 707/1 |

OTHER PUBLICATIONS

Ort, E.; "Compatibility Test Tools: Spec Trac"; Sun Microsystems, Inc., Aug. 2001, http://java.sun.com/developer/technicalArticles/JCPtools; pp. 1-6 (6 pages).

* cited by examiner

*Primary Examiner* — Li Zhen
*Assistant Examiner* — Evral Bodden
(74) *Attorney, Agent, or Firm* — Osha • Liang LLP (57) ABSTRACT

A method for generating a test file, that includes parsing annotated test code written in a source language to create a data structure representation of the annotated test code, generating test code in a markup language according to a plurality of testing definitions using the data structure representation, and storing the test code in the markup language in the test file.

15 Claims, 5 Drawing Sheets

METHOD AND SYSTEM FOR GENERATING A TEST FILE

BACKGROUND

In general, software testing is a systematic process designed to find differences between the expected behavior of a software system as specified in a software requirements document and the actual behavior of the software system. In other words, software testing is an activity for finding defects, commonly known as bugs, in the software system.

Complex software systems are tested, at least in part, using automated testing tools. More specifically, tests are developed to test specific requirements or features of a software system. A test may be source code and any accompanying information that exercises a particular feature, or part of a feature of a software system. Further, each test may include one or more test cases directed to specific requirements of the feature, or part of a feature to be tested. These tests are provided as input to an automated testing tool that uses the test cases to test the software system.

Typically, the source code in the tests is encoded in the same programming language as that used to develop the software system. However, the tests themselves are defined using the preferred input language of the automated testing tool, e.g., a scripting language, markup language, etc. In such a scenario, the test source code is created separately and manually inserted into the test definition written in the preferred input language. For example, some automated testing tools for Java compatibility testing require the tests to be written in extended markup language (XML). For such automated testing tools, a document type definition (DTD) is created that specifies the XML format of test definitions. The tests are then directly written in the specified DTD format (i.e., the tests are written in XML in accordance with the specified DTD format) and fragments of JAVA™ code are inserted as needed into these test definitions. JAVA™ is a trademark of Sun Microsystems™, Inc. located in Santa Clara, Calif.

SUMMARY

In general, in one aspect, the invention relates to a method for generating a test file, that includes parsing annotated test code written in a source language to create a data structure representation of the annotated test code, generating test code in a markup language according to a plurality of testing definitions using the data structure representation, and storing the test code in the markup language in the test file.

In general, in one aspect, the invention relates to a system for generating a test file, that includes a program development tool for creating annotated test code in a source language, and a transformation tool configured to parse the annotated test code in a source language to create a data structure representation of the annotated test code, generate test code in a markup language according to a plurality of testing definitions using the data structure representation, and store the test code in the markup language in the test file.

In general, in one aspect, the invention relates to a computer readable medium that includes computer code embodied therein for causing a computer system to parse annotated test code written in a source language to create a data structure representation of the annotated test code, generate test code in a markup language according to a plurality of testing definitions using the data structure representation, and store the test code in the markup language in a test file.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for generating a test file for testing a program that is suitable for use by a testing tool. The test file is created by transforming test code in a source language (i.e., one or more tests defined using a source language) to test code in a markup language (i.e., the one or more tests expressed in the markup language). The test code in the source language may include source code written in the source language that exercises a particular feature, or part of a feature of a program and any metadata need to execute the source code. Further, the source language test code may include definitions of test cases and test groups. In some embodiments of the invention, a test case tests an assertion in the specification of the program or a particular feature, or part of a feature, of an assertion. A test case may include both input into the program as well as a specification of the expected output. A test group is a collection of test cases. For example, test cases in a test group may all test a specific method of a program.

Embodiments of the invention allow a test developer to write tests in a source language and add embedded annotations that are used by a transformation tool transform the source language test code into test code expressed in a markup language. The annotations may specify both metadata for the test code as well as a mapping from blocks of source code in the source language test code to blocks of test code in the markup language test definitions. The transformation tool transforms the tests from the source language to the markup language using the annotations and stores the resulting markup language test code in a test file.

The resulting test file complies with the format required by a testing tool and may be used by the test tool to test the program. In one or more embodiments of the invention, the format is defined by a collection of testing definitions. The testing definitions define the types of tags used in the markup language test code. For example, if the markup language is XML, the testing definitions maybe expressed in Document Type Definition (DTD) format. The testing definitions define the requirements for the test file. Specifically, the test code in the test file obtained from the transformation tool complies with the testing definitions in one or more embodiments of the invention.

An annotation is an identifier that may be used to provide information about a test as a whole and/or sections of a test. For example, an annotation may be used to specify an author, title, description, and identification of the portion of the program that is tested by the test. An annotation may also be used to specify the functionality of sections of the test definition, such as whether a section is a test case, a test group, a macro, or requires any of the above. For example, an annotation may be used to specify inline assertions and describe values, side effects, and exceptions to expected results from executing a section of the test. Further an annotation may be used to specify inputs and preconditions to sections of the test.

In one or more embodiments of the invention, a test developer defines test code in a source language that is an object oriented programming language or a procedural programming language. If the source language is an object oriented programming language, a test group in a markup language version of the test may be defined as a class in the source language version of the test and a test case in the markup language version of the test may be defined as a method in the source language version of the test. For example, the source language may be the JAVA™ programming language. In such scenario, the annotations in test code written in JAVA™ may be JAVA™ programming language annotations. Alternatively, the annotations may be decorators or other such indicators in the Python programming language, C# programming language, or other programming languages.

Figure 1:
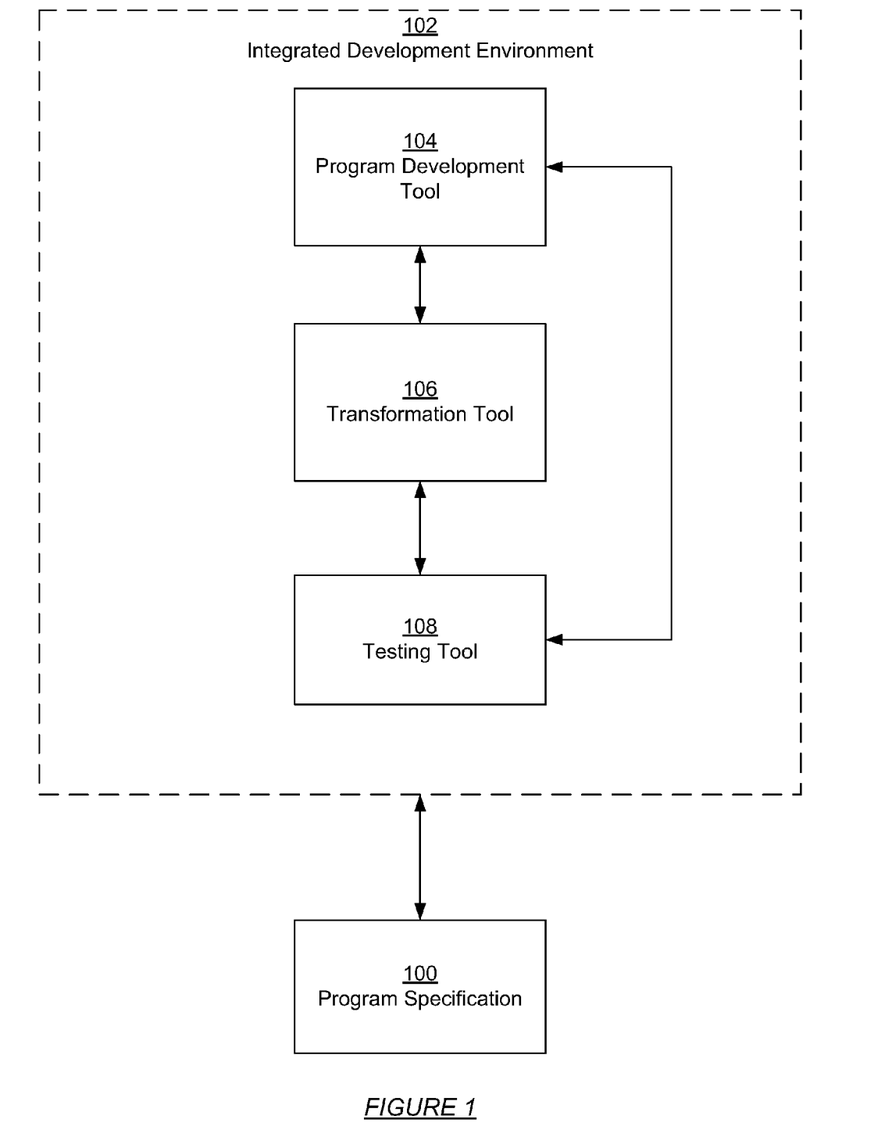
FIG. 1 shows a schematic diagram of a system in accordance with one or more embodiments of the invention.

FIG. 1 shows a schematic diagram of a system in accordance with one or more embodiments of the invention. As shown in FIG. 1, the system may include an program specification (100) and an IDE (102) in accordance with one or more embodiments of the invention.

A program specification (100) is the collection of requirements for a program. Specifically, in one or more embodiments of the invention, the testing of the program is compatibility testing. Compatibility testing is used to determine whether the program complies with the program specification (100). For example, compatibility testing may be to test whether the interface to the program complies with the specification.

In one or more embodiments of the invention, the program specification (100) may be a specification for virtually any programming language. For example, the programming specification may be the JAVA™ specification. In particular, the program may be an implementation of JAVA™ and the compatibility testing may be used to determine whether the implementation complies with the standards set by the JAVA COMMUNITY PROCESS℠ (JCP) for the application programming interface (API) of JAVA™ implementations. JAVA COMMUNITY PROCESS℠ is a service mark of Sun Microsystems™, Inc. located in Santa Clara, Calif. Alternatively, the program specification (100) may be a specification for a program that is an application, such as a user level application, server application, etc.

The IDE (102) is an application which assists in the development of a program and test code for the program using a source language (i.e., a programming language). Specifically, an IDE (102) provides an interface by which a developer may design and develop the program and the test code. The IDE (102) may include a number of software development tools made available to the developer through a graphical user interface (GUI) designed to facilitate the use of these tools. The software development tools may include a program development tool (104), a transformation tool (106), and a testing tool (108). Alternatively, any of the aforementioned tools may be external to the IDE (102). Further, the IDE (102) may support one or more programming languages including object oriented programming languages (e.g., JAVA™ programming language, C++ programming language, Smalltalk programming language, C# programming language, Python programming language, etc.), as well as procedural languages, such as C, Fortran, and other such languages.

A program development tool (104) is a tool used to create the program and the test code. For example, the program development tool may include a source code editor, a compiler or interpreter, tools for automating the software build process, functionality for source code control, syntax highlighting, and a debugger. Further, when the IDE supports object oriented programming, the program development tool (104) may include a class browser, an object inspector, and a class hierarchy diagram.

A transformation tool (106) is a program for generating a test file suitable for input to the testing tool (108) by transforming the test code defined in a source language supported by the program development tool (104) into test code in a markup language. Specifically, the transformation tool (106) includes functionality to identify sections of the source language test code that are annotated, interpret the annotations, and generate the markup language test code based on the annotations.

In one or more embodiments of the invention, the transformation tool uses a template to generate the markup language test code. In one or more embodiments of the invention, the template is written in a scripting language. The template may include both static portions and dynamic portions The static portions are markup language test code that is to be included in the test file. The dynamic portions are used to generate sections of the markup language test code that depend on the content of the source language test code. During the generation of the markup language test code, the static portions of the template are written to the test file, while the dynamic portions are executed. The execution of the dynamic portions generates output based on the source language test code that is written to the test file.

For example, the template may be a Groovy programming language data structure in which dynamic portions written in the JAVA™ programming language code are embedded in static portions written in XML. In the example, when XML code is encountered, the XML code is written to the test file. When JAVA™ programming language code is encountered, the JAVA™ programming language code is executed. The JAVA™ programming language code may include a method call on a method that generates output from the source language test code. One skilled in the art will appreciate that the template may be optional. In particular, the transformation tool may perform direct transformation to the markup language, such as by using a loop and a series of conditional expressions. Each conditional expression may have a body which writes the test code in a markup language to the test file. The markup language may be virtually any type markup language and is not intended to be limited to XML.

A testing tool (108) includes functionality to test the program using the test file to determine whether the program complies with the program specification (100). In one or more embodiments of the invention, the testing tool (108) requires the test file to comply with a unified testing definition format as defined in a markup language. In one or more embodiments of the invention, the testing tool is the JAVA™ Compatibility Kit (JCK). Alternatively, the testing tool (108) may be another Technology Compatibility Kit (TCK), or any other tool that includes functionality to test whether a program complies with a program specification (100) using the test file. Further, the transformation tool (106) may be a component of the testing tool (108).

Figure 2:
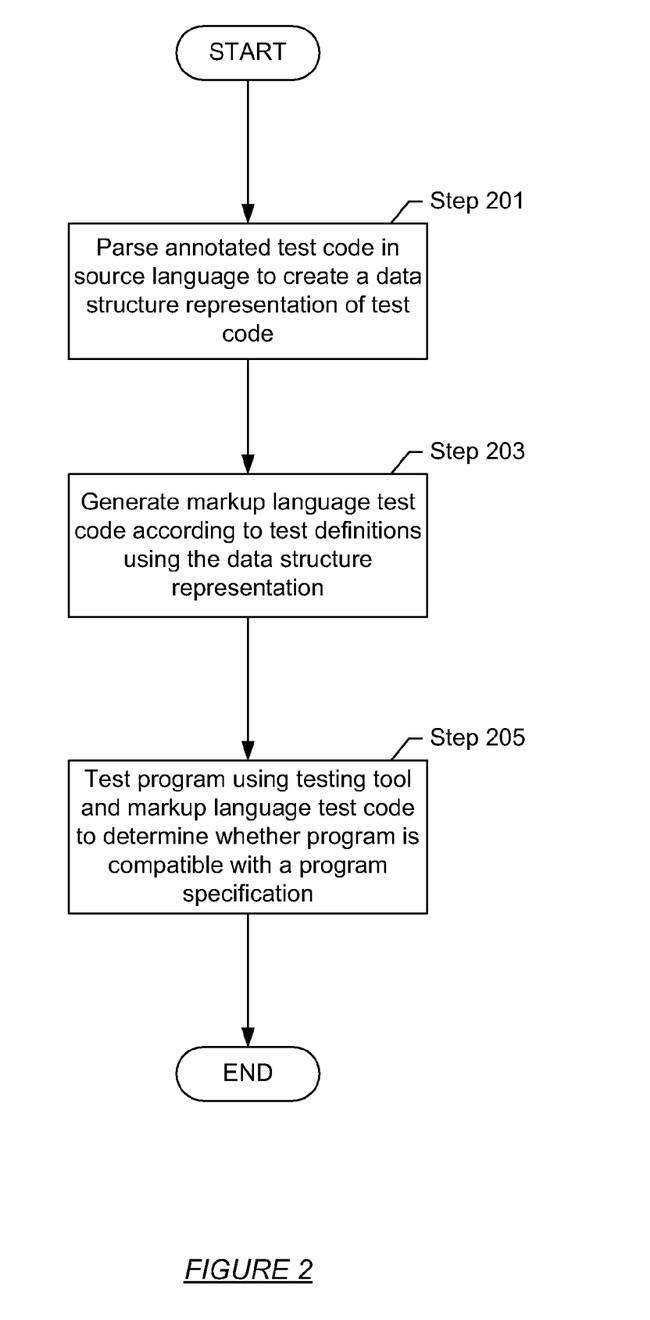
FIGS. 2-4 show flowcharts of methods in accordance with one or more embodiments of the invention.
Figure 3:
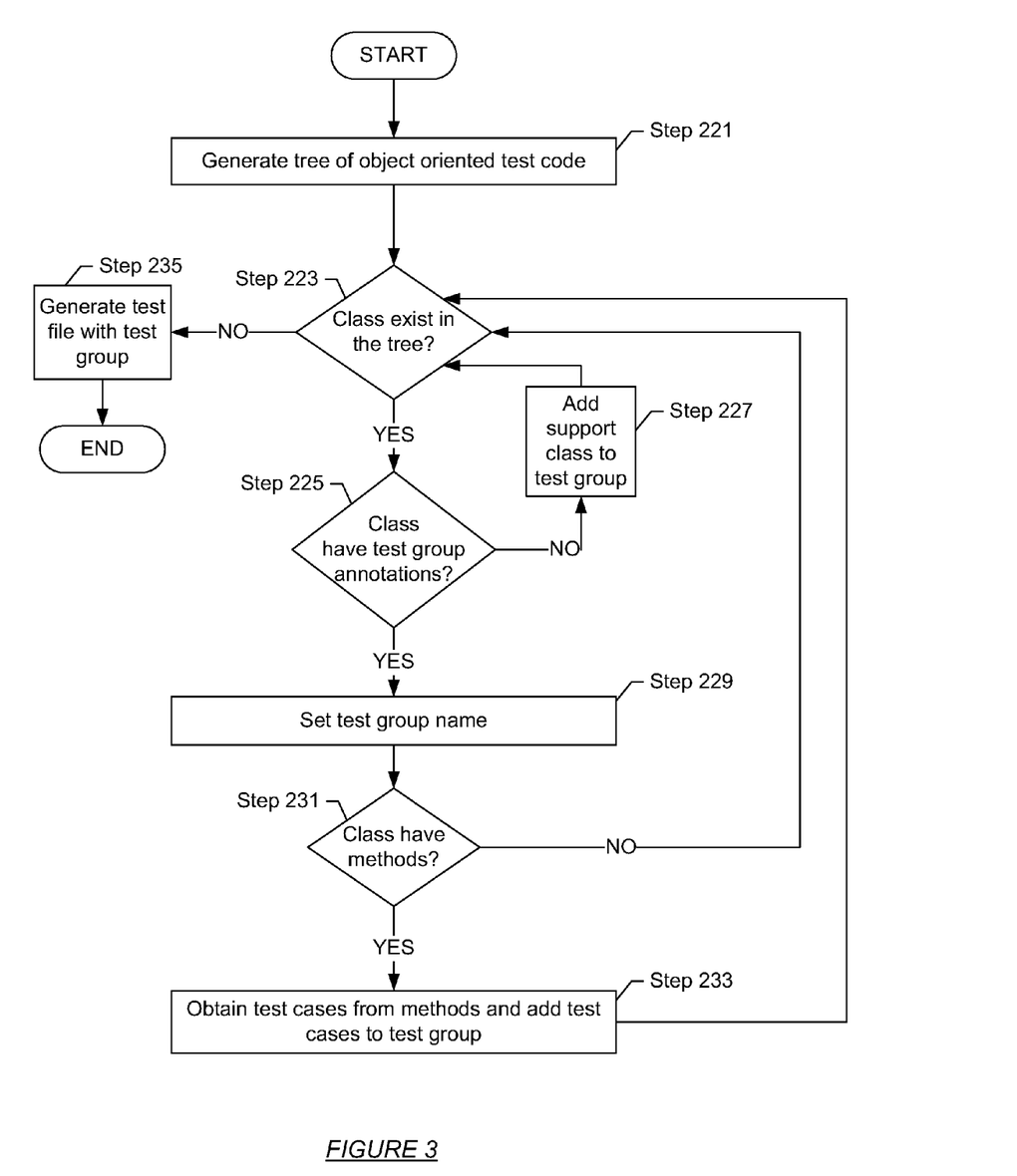
Figure 4:
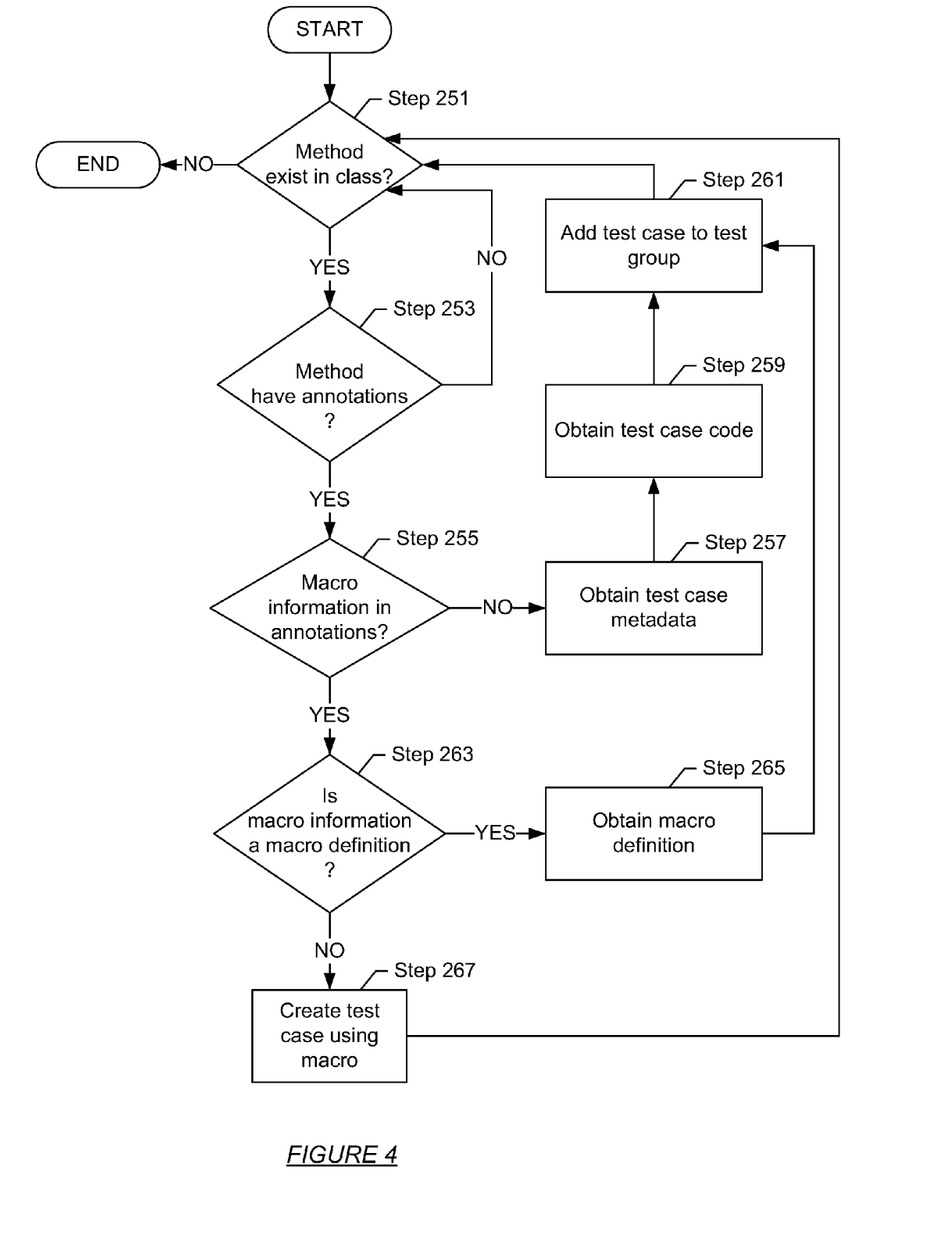

FIGS. 2-4 show flowcharts of methods in accordance with one or more embodiments of the invention. While the various steps in these flowcharts are presented and described sequentially, one of ordinary skill in the art will appreciate that some or all of the steps may be executed in different orders and some or all of the steps may be executed in parallel.

As discussed above, a test developer creates test code in a source programming language. Further, the test developer may also be the developer creating the program to be tested. In the latter case, the developer may create the tests while creating the program. For example, the IDE may provide a window for the creation of the test code which is displayed next to a window used to create the program. Thus, while the developer is writing a method or function in the program, the developer may create test code for the method or function using the same programming language used to create the method or function. In one or more embodiments of the invention, once the test code is created, the test code is transformed into test code in a markup language format and stored in a test file so that the program may be tested. Specifically, the IDE may include a selectable option in a menu for invoking a transformation tool to transform the source language test code into markup language test code and store the markup language test code in a test file.

FIG. 2 shows a flowchart of a general method for creating a test file from test code written in a source language in accordance with one or more embodiments of the invention. Initially, the annotated test code written in the source language is parsed to create a data structure representation of the test code (Step 201). In one or more embodiments of the invention, the data structure representation is a tree, such as a parse tree or an abstract syntax tree. Alternatively, the data structure representation may be a graph with at least one cyclic relationship.

Next, the transformation tool generates markup language test code according to testing definitions using the data structure representation (Step 203). Specifically, the transformation tool may iterate through the graphical representation and identify annotations in the test code. For example, the transformation tool may execute a template by executing code referred to in the dynamic portion of the template. The static portions of the template are stored directly in the test file while the code in the dynamic portion iterates through the data structure representation to identify the values to be written to the test file.

Once the annotated source language test code is transformed into markup language test code, the testing tool tests the program using the markup language test code to determine whether the program is compatible with the program specification (Step 205). At this stage, the testing tool may perform the operations specified by the markup language test code and determine whether the results generated by the operations are the same as the expected results. If the generated results are not the same, then the testing tool may deem the program as incompatible with the program specification. Alternatively, the testing tool may output the results and allow a developer to determine whether the program is compatible.

FIGS. 3 and 4 show a flowchart of a method for generating the test file when the source language is an object oriented language. Initially, a data structure representation of the object oriented test code is generated (Step 221). For example, the data structure representation may be a tree, such as a parse tree. The tree may be generated in a manner similar to a compiler generating the tree. Specifically, each token of the test code may be sequentially obtained, identified to determine the function of the token (e.g., marker for code block, variable, method call, etc.) and added to the tree accordingly.

In one or more embodiments of the invention, the tree may be generated by calling an application programming interface (API) in the source language of the source code. For example, the JAVA™ programming language includes a compiler tree API which may be used to generate the tree.

Next, the transformation tool determines whether a class exists in the tree (Step 223). Specifically, a class may be determined to exist based on the keyword class in the tree representation. If the class exists, then the class may be found in the root of the tree (i.e., a node of the tree which is not a child of another node).

If a class exists in the tree, the transformation tool determines whether the class has one or more test group annotations (Step 225). If annotations are stored in the tree with the class, the annotation is obtained from the node representing the class. Alternatively, the annotation is obtained using a call to the API of the source language. In one or more embodiments of the invention, a test group annotation, if the test group annotation exists, identifies the class as being a test group. If the class does not have a test group annotation, the class may be a support class. A support class is used by other classes in the test code. Specifically, rather than the testing tool using a support class directly, an object of the support class may be used to create an object that is used by another class which is executed by the testing tool.

Accordingly, if the class does not have annotations, the class is added as a support class to a test group that uses the support class (Step 227). Specifically, the class is added to the test file. In one or more embodiments of the invention, the transformation tool identifies all support classes in the tree before identifying non-support classes. When the transformation tool finds a support class, the transformation tool may mark the support class, such as by storing the support class separately from the tree or maintaining a reference to the support class. Thus, when a class is found that requires the support class, the transformation tool may add the support class to the test group of the class.

Alternatively, rather than adding a class that does not have test group annotations to the test group, when a class does not have a test group annotation, the class may be ignored. When ignoring the class, an empty test file may be generated. The empty test file may have only the information in the template.

If the class has test group annotations (Step 225), the class is a test group A test group is created and the test group name is set for the class (Step 229). Specifically, the annotations in the class may specify the test group name as well as any other attributes (e.g., description, author, tested package, tested program, etc.). In such scenario, the test group is created using the template and the attributes in the annotations are added to the test group. As an alternative to the name of the test group specified in the annotation, the name of the class or the name of a file may be used as the name of the test group. Alternatively, the name of the class may be used as a unique identifier for the test group.

Further, a determination is made whether the class has methods (Step 231). Determining whether the class has methods may be performed in a manner similar to determining whether a class exists in the tree. For example, a method may be a child node of the class and/or may be specified by the keyword method. Accordingly, a method, if one exists, may be found by iterating through the tree. If the class has methods, then test cases are obtained from the methods and added to the test group (Step 233). Obtaining the test cases and adding the test cases to the test group is described below and in FIG. 4.

Continuing with FIG. 3, after adding the test cases to the test group (Step 233), a determination is made whether another class exists in the tree (Step 223). If another class does not exist in the tree, then the test file is generated with the test group (Step 235). Specifically, the test group is stored in the test file. The test file may be stored in temporary or permanent storage.

FIG. 4 shows a flowchart for obtaining test cases from methods in a class in accordance with one or more embodiments of the invention. Initially, a determination is made whether an unprocessed method exists in a class (Step 251). A method is unprocessed when the method has not been processed by the transformation tool.

If a method exists, the transformation tool determines whether the method has annotations (Step 253). A method may not have testing annotations if the method is only used by other methods and is not for a separate test case. In such scenario, the method is directly added to the test group (not shown).

If the method has annotations, the transformation tool determines whether macro information exists in the annotations (Step 255). The macro information may specify that the method is a macro or uses a macro. A macro may be used by a developer, for example, when the same section of test code is used for multiple test cases in a test group. In such scenario, the developer may specify in the annotations that the section of test code is a definition of a macro or uses a macro.

If macro information is not present in the annotations, the test case metadata is obtained (Step 257). Specifically, the annotations for the test case are obtained from the tree and each attribute identified. The identified attributes for the test case may include inline assertions describing the function of the test case, expected results, name of the test case, a description of what the test case is testing, etc. Rather than the annotation having the name of the test case, the method name may be used as the name of the test case. Further, the test case code is obtained (Step 259). The test case code is the body of the method. Alternatively, further transformations may be performed on the body of the method to obtain the test case code.

Once the test case code and the metadata are obtained, the test case is added to the test group (Step 261). Adding the test case to the test group may include populating the fields in a template according to the values of the attributes of the test case. Further, the test case code may be added to the body of the test case definition in the template. Once the test case is added, a determination is made whether another method exist in the class (Step 251).

If macro information for a method exists in the annotations (Step 255), a determination is made whether the macro information is a macro definition (Step 263). The transformation tool may determine that the macro information is a macro definition by identifying a keyword, such as "macro," as the macro information. In such a scenario, the macro definition is obtained (Step 265). Specifically, the macro information may be stored with the test group as a macro. Alternatively, in one or more embodiments of the invention, the macro definition may be identified, such as by reference, and imported directly into test cases that use the macro definition. Further, in one or more embodiments of the invention, before identifying test cases, the tree may be searched for macro definitions. Specifically, an initial pass through the tree may be used to identify and obtain macro definitions. In a secondary pass through the tree, the test cases may be identified.

Alternatively, if the macro information is not for a macro definition, then the macro information is used to create a test case using a macro. For example, the macro information may specify to use a macro and the name of the macro to use. In such scenario, the transformation tool obtains the macro according to the name and the test case is created using the macro (Step 267). Creating a test case using the macro may be performed by obtaining the test case metadata and the test case code. Further, in the positions in which the test case code refers to the macro, code from the macro may be added directly into the test case code when adding the test case to the test group. Alternatively, the test case code may be added to the test group with a reference to the macro. Thus, a test case which uses a macro is added to the test group (Step 261).

While FIGS. 3 and 4 show a flowchart of a method in which the programming language is object oriented, the method may also be performed with a procedural language. Specifically, rather than interpreting the classes as test groups and the methods as test cases, files may be used as the test groups and procedures may be used as the test cases. Further, while the steps in the methods of FIGS. 2, 3, and 4 are presented and described sequentially, one of ordinary skill in the art will appreciate that some or all of the steps may be executed in different orders, some or all of the steps may be executed in parallel, and/or some of the steps may be combined or omitted.

In the following example, consider the scenario in which the JAVA™ programming language String class is tested. The following is an example of JAVA™ test code that may be created to test the String class:

| | Example of Test Code |
|---|---|
| 1. | import javasoft.sqe.javatest.Status; |
| 2. | import javasoft.sqe.javatest.lib.MultiTest; |
| 3. | import javasoft.sqe.xgen.ann2.*; |
| 4. | |
| 5. | @TestGroup |
| 6. | @Title("Example of an annotated test") |
| 7. | @Description("Description of an annotated test") |
| 8. | @TestedPackage("java.lang") |
| 9. | @TestedClass("java.lang.String") |
| 10. | @Author("John Smith") |
| 11. | @Dependencies({"SwissKnife", "BaseExceptionTest"}) |
| 12. | public class SimpleExample extends MultiTest { |
| 13. | |
| 14. | @TestCase |
| 15. | @InlineAssertion( "Tests if this string ends with the specified suffix." ) |
| 16. | public Status test0001( ) { |
| 17. | if (new String("StringWithSuffix").endsWith("Suffix")) { |
| 18. | return Status.passed("OK"); |
| 19. | } else { |
| 20. | return Status.failed("String does not end with expected suffix"); |
| 21. | } |
| 22. | } |
| 23. | @TestCase |
| 24. | @InlineAssertion({ |
| 25. | "Returns a new string that is a substring of this string", |
| 26. | "The substring begins at the specified beginIndex " + |
| 27. | "and extends to the character at index <code>endIndex − 1</code>." |
| 28. | }) |
| 29. | public Status test0002( ) { |
| 30. | String s = "ab".concat("c"); |
| 31. | if ("abc".equals(s)) { |
| 32. | return Status.passed("OK"); |
| 33. | } else { |
| 34. | return Status.failed("Result of concatenation was not \"abc\" but \"" + s +"\""); |
| 35. | } |
| 36. | } |
| 37. | } |

In the above example, lines 1-3 identify packages which are imported when the JAVA™ test code is compiled. As shown in line 3, one of the imported packages is an annotation package. The "@" symbol in the above denotes that the information after the "@" symbol is an annotation that refers to the block of code immediately below the "@" symbol. Accordingly, line 5 specifies that the class in lines 12-37 is a test group. Lines 6-11 specify attributes for the test group including title (i.e., "Example of an annotated test"), description (i.e., "Description of an annotated test"), tested package (i.e., "java.lang"), tested class (i.e., "java.lang.String"), author of the test code (i.e., "John Smith"), and dependencies (i.e., "SwissKnife" and "BaseExceptionTest"), respectively.

Further, as shown in the example, the class has two methods beginning on lines 14 and 23 respectively. Each method includes an annotation "@TestCase" on line 14 and 23, respectively, to specify that the method is a test case. Further, each method includes an inline assertion, line 15 and lines 24-28, respectively, which defines the function of the test case. The body of each method is used as the test case.

The following is an example of output generated by the transformation tool when the above example JAVA™ test code is transformed to test code in XML format

| Example of the Output of the Transformation Tool |
| --- |
| 1. <?xml version="1.0"?> |
| 2. <!DOCTYPE TestGroup SYSTEM "testgenspec.dtd"> |
| 3. <TestGroup ID="SimpleExample"> |
| 4.   <TestGroupDocumentation> |
| 5.     <Title>Example of an annotated test</Title> |
| 6.     <Description>Description of an annotated test</Description> |
| 7.     <TestedPackage>java.lang</TestedPackage> |
| 8.     <TestedClass>java.lang.String</TestedClass> |
| 9.     <Author>John Smith</Author> |
| 10.   </TestGroupDocumentation> |
| 11.   <TestGroupAttributes> |
| 12.     <AttrElem Name="scInfo">%W% %E%</AttrElem> |
| 13.     <Keyword>runtime</Keyword> |
| 14.     <Keyword>positive</Keyword> |
| 15.   </TestGroupAttributes> |
| 16.   <CodeSet> |
| 17.     <Dependency> |
| 18.       <Lib>SwissKnife</Lib> |
| 19.       <Lib>BaseExceptionTest</Lib> |
| 20.     </Dependency> |
| 21.     <BaseClass>MultiTest</BaseClass> |
| 22.   </CodeSet> |
| 23.   <!-- ================ --> |
| 24.   <TestCase ID="test0001"> |
| 25.     <TestCaseDocumentation> |
| 26.       <TestCaseSpec> |
| 27.         <InlineAssertion>Tests if this string ends with the specified suffix</InlineAssertion> |
| 28.       </TestCaseSpec> |
| 29.     </TestCaseDocumentation> |
| 30.     <TestCode><![CDATA[ |
| 31.     if (new String("StringWithSuffix").endsWith("Suffix")) { |
| 32.       return Status.passed("OK"); |
| 33.     } else { |
| 34.       return Status.failed("String does not end with expected suffix"); |
| 35.     } |
| 36.   ]]></TestCode> |
| 37.   </TestCase> |
| 38.   <!-- ================ --> |
| 39.   <TestCase ID="test0002"> |
| 40.     <TestCaseDocumentation> |
| 41.       <TestCaseSpec> |
| 42.         <InlineAssertion>Returns a new string that is a substring of this string.</InlineAssertion> |
| 43.         <InlineAssertion><![CDATA[substring begins at the specified beginIndex and extends to the character at index <code>endIndex - l</code>]]></InlineAssertion> |
| 44.       </TestCaseSpec> |
| 45.     </TestCaseDocumentation> |
| 46.     <TestCode><![CDATA[ |
| 47.     String s = "ab".concat("c"); |
| 48.     if ("abc".equals(s)) { |
| 49.       return Status.passed("OK"); |
| 50.     } else { |
| 51.       return Status.failed("Result of concatenation was not \"abc\" but \"" + s +"\""); |
| 52.     } |
| 53.   ]]></TestCode> |
| 54.   </TestCase> |
| 55.   <!-- ================ --> |
| 56. </TestGroup> |

As shown in the above example, the annotations are used to define the attribute values for the XML tags in the XML test code. Line 2 specifies that the XML test code complies with the DTD in "testgenspec.dtd." Further, line 3 uses the class name as the test group ID. Lines 4-10 of the XML test code is transformed from the annotations in lines 6-10 of the JAVA™ test code to define the test group documentation. The dependency from line 11 of the JAVA™ test code is used to define the dependency in lines 17-20 of the XML test code.

Similarly, test cases in the XML test code are defined from the JAVA™ test code. Specifically, lines 25-29 and lines 40-45 of the XML test code is transformed from the annotations in lines 14-15 and lines 23-28, respectively, of the JAVA™ test code to define the test case documentation. The tests are defined in lines 30-36 and lines 46-53 of the XML test code and correspond to the bodies of the methods defined in lines 17-21 and 30-35.

As shown in the example, rather than requiring that the developer generate the markup language test code, embodiments of the invention generate the markup language test code automatically from test code written in a source language, such as the JAVA™ programming language.

Figure 5:
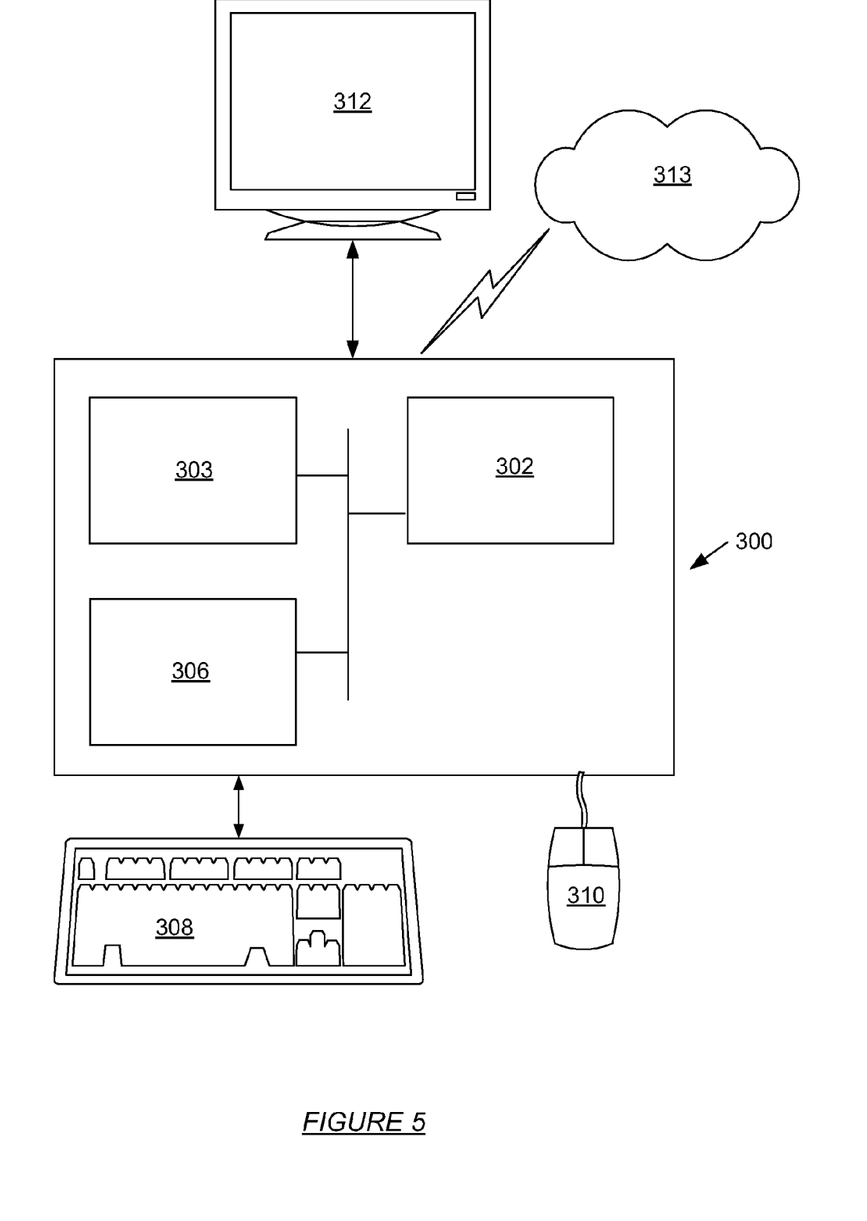
FIG. 5 shows a computer system in accordance with one or more embodiments of the invention.

Embodiments of the invention may be implemented on virtually any type of computer regardless of the platform being used. For example, as shown in FIG. 5, computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (314) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., IDE, transformation tool, testing tool, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a mechanism for a developer to easily develop test code. Specifically, while creating a program in a source language, the developer may create the test cases for the test code in the same source language. Alternatively, a test developer may create the test code in the same source language after the developer creates the program in the source language. Often the source language version requires fewer lines of code than a markup language version. Accordingly, embodiments of the invention provide a mechanism whereby the developer may use the fewer lines of code to create tests for a program. Further, the source code tests are automatically transformed into markup language tests suitable for input to a testing tool, thus not requiring the developer to write the tests in the markup language.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a test file, comprising:
   receiving annotated test code comprising a first testing annotation, a second testing annotation, a class, and a method comprising test case code,
      wherein the first testing annotation defines an attribute value for an attribute of a test group,
      wherein the second testing annotation defines an attribute value for an attribute of a test case, and
      wherein the annotated test code is written using an object oriented programming language;
   parsing, by one or more computer processors, the annotated test code to create a data structure representation of the annotated test code;
   generating, by the one or more computer processors and using the data structure representation, test code in a markup language according to a plurality of testing definitions to obtain generated test code, wherein generating the test code comprises:
      identifying the class in the data structure representation;
      determining, by an existence of the first testing annotation in the class, that the class is a test group class;
      obtaining a template for the test group class in response to determining that the class is the test group class;
      extracting, from the data structure representation, the attribute value for the attribute of the test group in the first testing annotation;
      identifying, from the first testing annotation, a markup language tag defining a first field in the template;
      populating a value of the first field in the template with the attribute value for the attribute of the test group;
      identifying the method in the data structure representation;
      determining, by an existence of the second testing annotation in the class, that the method corresponds to the test case; and
      creating, using the template, the test case in response to determining that the method corresponds to the test case by:
         extracting, from the data structure representation, the attribute value for the attribute of the test case in the second testing annotation;
         identifying, from the second testing annotation, a markup language tag defining a second field in the template;
         populating a value of the second field in the template with the attribute value for the attribute of the test case; and
         storing the test case code in a body of the test case; and
   storing the generated test code in the test file.

2. The method of claim 1, further comprising:
   testing a program using the generated test file to determine whether the program is compatible with a program specification.

3. The method of claim 1, wherein creating the test case further comprises:
   determining whether the method has macro information based on a third testing annotation in the method;
   retrieving a macro using the macro information; and
   using the macro to create the test case.

4. The method of claim 3, wherein creating the test case further comprises:
   identifying a macro definition for the macro based on the third testing annotation; and
   importing the macro definition into the test case.

5. The method of claim 1, wherein generating the test code further comprises:
   identifying a support class in the data structure representation; and
   adding the support class to the test group.

6. The method of claim 1, wherein the test case comprises test metadata.

7. The method of claim 6, wherein the test metadata comprises an assertion.

8. The method of claim 1, wherein the object oriented programming language is Java™.

9. The method of claim 1, wherein the markup language is extensible markup language.

10. The method of claim 1, wherein the data structure representation is a tree.

11. A system for generating a test file, comprising:
   a computer processor;
   a program development tool, executing on the computer processor, for creating annotated test code using an object oriented programming language and comprising a first testing annotation, a second testing annotation, a class, and a method comprising test case code, wherein the first testing annotation defines an attribute value for an attribute of a test group, and wherein the second testing annotation defines an attribute value for an attribute of a test case, and
   a transformation tool executing on the computer processor and configured to:
      receive the annotated test code from the program development tool;
      parse the annotated test code to create a data structure representation of the annotated test code;
      generate, using the data structure representation, test code in a markup language according to a plurality of testing definitions to obtain generated test code, wherein generating the test code comprises:
         identifying the class in the data structure representation;
         determining, by an existence of the first testing annotation in the class, that the class is a test group class;
         obtaining a template for the test group class in response to determining that the class is the test group class;
         extracting, from the data structure representation, the attribute value for the attribute of the test group in the first testing annotation;
         identifying, from the first testing annotation, a markup language tag defining a first field in the template;

populating a value of the first field in the template with the attribute value for the attribute of the test group;

identifying the method in the data structure representation;

determining, by an existence of the second testing annotation in the class, that the method corresponds to the test case; and creating, using the template, the test case in response to determining that the method corresponds to the test case by:

extracting, from the data structure representation, the attribute value for the attribute of the test case in the second testing annotation;

identifying, from the second testing annotation, a markup language tag defining a second field in the template;

populating a value of the second field in the template with the attribute value for the attribute of the test case; and     storing the test case code in a body of the test case; and store the generated test code in the test file.

12. The system of claim 11, further comprising:

a testing tool configured to:

test a program using the generated test file to determine whether the program is compatible with a program specification.

13. The system of claim 12, wherein the testing tool is a Java™ Compatibility Kit.

14. The system of claim 11, wherein the markup language is extensible markup language.

15. A non-transitory computer readable medium comprising computer code embodied therein for causing a computer system to:

receive annotated test code comprising a first testing annotation, a second testing annotation, a class, and a method comprising test case code,     wherein the first testing annotation defines an attribute value for an attribute of a test group,     wherein the second testing annotation defines an attribute value for an attribute of a test case, and     wherein the annotated test code is written using an object oriented programming language;

parse annotated test code to create a data structure representation of the annotated test code;

generate, using the data structure representation, test code in a markup language according to a plurality of testing definitions to obtain generated test code,     wherein generating the test code comprises:

identifying the class in the data structure representation;

determining, by an existence of the first testing annotation in the class, that the class is a test group class;

obtaining a template for the test group class in response to determining that the class is the test group class;

extracting, from the data structure representation, the attribute value for the attribute of the test group in the first testing annotation;

identifying, from the first testing annotation, a markup language tag defining a first field in the template;

populating a value of the first field in the template with the attribute value for the attribute of the test group;

identifying the method in the data structure representation;

determining, by an existence of the second testing annotation in the class, that the method corresponds to the test case; and     creating, using the template, the test case in response to determining that the method corresponds to the test case by:

extracting, from the data structure representation, the attribute value for the attribute of the test case in the second testing annotation;

identifying, from the second testing annotation, a markup language tag defining a second field in the template;

populating a value of the second field in the template with the attribute value for the attribute of the test case; and         storing the test case code in a body of the test case; and store the generated test code in a test file.

* * * * *